March 6, 1962 T. J. RYAN 3,023,582
VORTEX CIRCULATION GUIDE VANES
Filed May 9, 1958 2 Sheets-Sheet 2
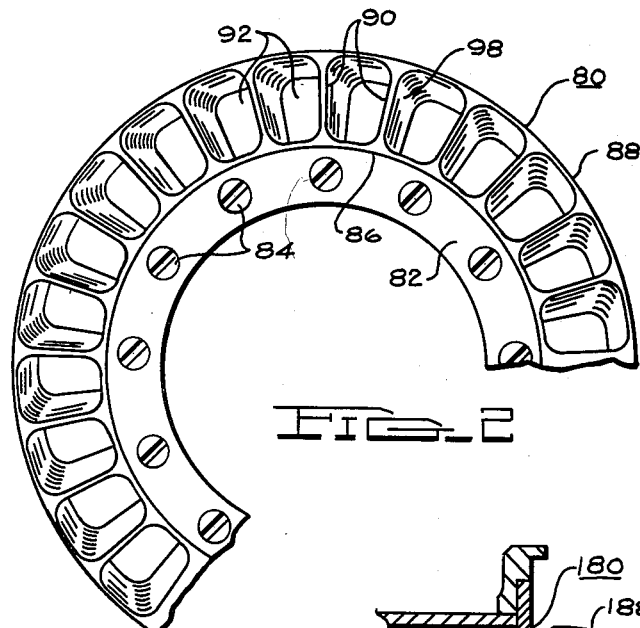
FIG_2
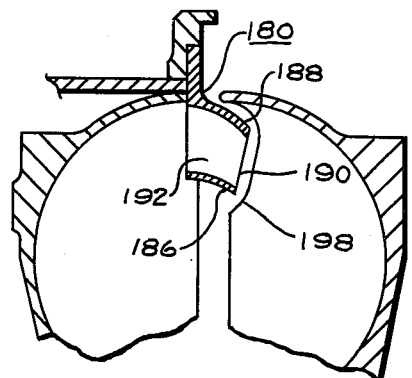
FIG_3
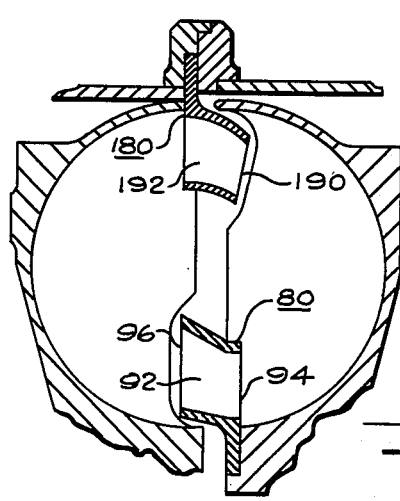
FIG_4
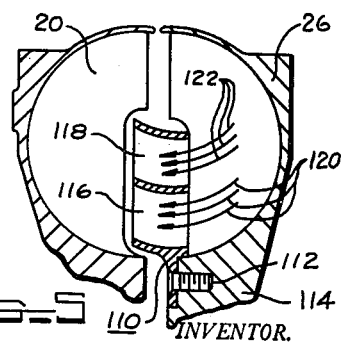
FIG_5
INVENTOR.
THOMAS J. RYAN
BY
SMITH, WILSON, LEWIS & McRAE United States Patent Office 3,023,582
Patented Mar. 6, 1962

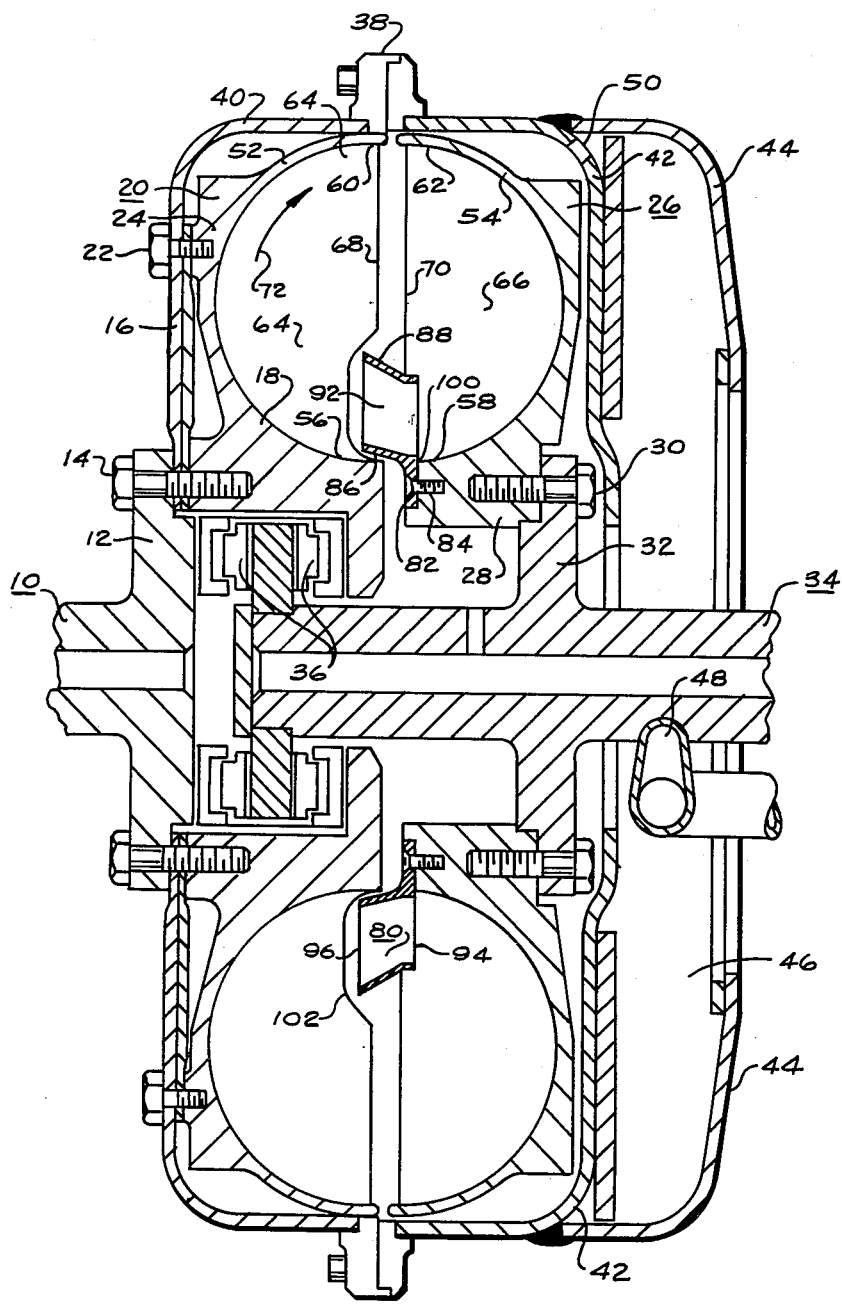

3,023,582
VORTEX CIRCULATION GUIDE VANES
Thomas J. Ryan, Detroit, Mich., assignor to American Radiator & Standard Sanitary Corporation, New York, N.Y., a corporation of Delaware
Filed May 9, 1958, Ser. No. 734,249
8 Claims. (Cl. 60—54)

This invention relates to fluid couplings and more particularly to an improved fluid coupling wherein one or both of the fluid energizing impeller and the energy absorbing turbine members have fluid deflecting members positioned at their outlets to redirect the fluid to facilitate its entry into the cooperating rotor member thereby improving the performance of the coupling.

The impeller and turbine members of fluid couplings are interposed between driving and driven shafts, and have confronting concave chambers. Radially extending vanes divide the space within the chambers into a plurality of circumferentially spaced pockets through which the power transmitting liquid circulates to transmit torque. As the impeller rotates, liquid in the cavities formed by the radially extending vanes and shell is forced radially outwardly by centrifugal force to flow outward between the vanes. The impeller shell deflects the liquid axially and axial components of the velocity of the liquid force it to flow across the gap into the turbine or runner at the outer profile diameter of the coupling. The liquid is forced to flow radially inwardly in the turbine by the force exerted thereon by the continuing flow of liquid into the turbine from the impeller. The turbine shell deflects the liquid to flow axially at the inner profile of the turbine and the liquid leaves the turbine and bridges the gap to flow into the impeller adjacent the inner profile diameter of the impeller whereupon the cycle is repeated. As the liquid flows radially outwardly in the impeller it has kinetic energy imparted to it, and the liquid transfers most of its energy to the runner or turbine thereby imparting driving torque to the driven member.

The impeller of fluid couplings always rotates somewhat faster than does the turbine member, the difference in the relative speeds being referred to as "slip." The slip or loss of speed between the impeller and turbine is due to friction and turbulence losses. Based on a full circuit, the limit of torque transmission is reached when the slip is of such a magnitude that the runner shaft approaches stall. When a fluid coupling is operating at minimum slip, the velocity of liquid circulating in the fluid circuit is at its lowest value and the flow of liquid is therefore less turbulent.

I have found that the operation of a fluid coupling can be improved by the provision of fluid deflecting vanes to guide the liquid flowing from one of the rotatable members relative to the other. These fluid deflecting or guide vanes can be positioned at the outlet from the turbine to deflect the flow of liquid so that the liquid enters the impeller with minimum turbulence or they may be positioned at the outlet from the impeller to direct the liquid to enter the turbine with minimum turbulence. If desired, fluid deflecting vanes may be positioned at the outlets from both the turbine and the impeller to minimize fluid turbulence.

An object of my invention is therefore to provide a fluid coupling wherein fluid deflecting members are positioned adjacent the outlet from the turbine to guide the circulating liquid to the impeller with minimum turbulence.

Another object of my invention resides in the provision of an improved fluid coupling having fluid deflecting vanes adjacent the outlet from the turbine or impeller or both to minimize fluid turbulence.

Still another object of my invention is to provide an improved fluid coupling having angled fluid deflecting vanes at the outlet from the impeller or turbine members or both to minimize turbulence caused by the circulation of the power transmitting liquid.

Still another object of my invention resides in the provision of improved fluid energizing and energy absorbing vane members wherein the cross-sectional area of the vane sections adjacent their outlets are restricted to provide desired operating characteristics.

Another object of my invention is to provide a fluid coupling having liquid guide vanes adjacent the outlet from the turbine or impeller or both to reduce circulation losses and to reduce shock or impact stresses.

A further object of my invention is to provide a fluid coupling capable of operating over a wide range by varying the capacity of the power transmitting fluid circuit by varying the restriction of the outlet of the turbine or impeller members or both.

Other objects and advantages of my invention will be apparent from the following detailed description, considered in conjunction with the accompanying drawings submitted for purposes of illustration only and not intended to define the scope of the invention, reference being had for that purpose to the subjoined claims.

In the drawings wherein similar reference characters refer to similar parts throughout the several views:

FIG. 1 is a sectional view of a fluid coupling embodying my invention.

FIG. 2 is a front elevational view of a fluid deflecting guide vane ring.

FIG. 3 is a fragmentary sectional view of a fluid coupling wherein the impeller is provided with fluid deflecting guide vanes at the outer diameter.

FIG. 4 is a view similar to FIG. 3 illustrating a construction wherein the impeller has a deflecting guide vane ring at its outer diameter turbine member and has a fluid deflecting guide vane ring at its inner diameter.

FIG. 5 is a fragmentary view showing a portion of the fluid circuit wherein the turbine member is provided with a guide vane ring having a plurality of radially spaced fluid deflecting channel sections.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now more particularly to FIG. 1 it will be noted that a driving shaft 10 has a flange 12 connected by bolts 14 to a flange member 16 and to a hub section 18 of an impeller or primary rotor 20. The flange 16 is connected through bolts 22 with a web 24 carried by the impeller.

A turbine or secondary rotor 26 is disposed in cooperating relation to the impeller 20 and has a hub section 28 connected through bolts 30 with a flange 32 carried by a driven shaft 34. The driven shaft 34 is positioned axially by bearings 36 in the hub section 18 of the impeller 20.

The impeller 20 may, for example, have an outer peripheral flange 38 connected to an axial housing section 40 of the flange member 16 and to an inner casing 42 and an outer casing 44 forming therebetween a chamber 46 for the reception of a scoop tube 48. The quantity of liquid within the working circuit formed by the impeller and turbine members 20 and 26, is controlled by the position of the scoop tube 48 since apertures 50 provided in the inner casing 42 interconnect the space within the housing sections 40 and 42 with the chamber 46. Under most operating conditions the level of liquid in the casing space 46 is the same as in the working circuit.

The impeller and turbine members 20 and 26 have shells 52 and 54 contoured to provide confronting concave chambers extending from their inner profile diameters 56 and 58 to their outer profile diameters 60 and 62 respectively.

The impeller 20 and the turbine 26 each have a plurality of circumferentially spaced radially extending vanes 64 and 66. The vanes 64 and 66 of the impeller and turbine members have substantially flat preferably radially extending edges 68 and 70 respectively.

The impeller 20 has a fluid inlet adjacent its inner profile 56, and an outlet spaced radially outside of the inlet and adjacent the outer profile 60. The turbine 26 has a fluid inlet adjacent its outer profile 62 and has an outlet spaced radially inside of its inlet and adjacent the inner profile 58.

As the impeller 20 rotates, the vanes 64 force the liquid to rotate with the impeller shell 52 and centrifugal force is imparted to the liquid as it flows outwardly as shown by the arrow 72 between the impeller vanes 64. The shell 52 induces the liquid to move radially and axially in a circular path as shown by the arrow 72 in FIG. 1 as it moves outwardly in the fluid circuit. The liquid is accelerated as it moves radially outwardly, and it is deflected by the curvature of the impeller shell 52 to flow axially into the turbine 26. The liquid discharged axially from the impeller 20 flows into the turbine and impinges on the vanes 66, being deflected to flow radially inwardly by the turbine shell 54 toward the inner profile 58 of the turbine 26. As the circulating liquid is forced inwardly in the turbine 26 torque is extracted from the liquid and it is transferred through the turbine 26 and flange 32 to the driven shaft 34.

A continuous circulation of liquid from the impeller to the turbine and back to the impeller results from the fact that the liquid is forced to flow inwardly in the turbine 26 by the force exerted on the column of liquid by additional liquid discharged from the impeller into the turbine.

A vortex guide vane ring 80 has a radially inwardly extending flange 82 secured as by fasteners 84 to the hub 28 of the turbine 26 to rotate with the turbine. The vortex ring 80 has radially spaced rings 86 and 88 connected by radially extending vane members 90 defining therebetween circumferentially extending passages 92 as viewed in FIG. 1. The vane members 90 of the guide ring 80 are preferably aligned with the vanes 66 of the turbine to receive circulating fluid from the turbine with minimum turbulence and redirect it into the fluid circuit of the impeller 20. If desired the radial vane members 90 may align with alternately spaced turbine vane members 66 or some other desired sequence of spacing. The radially spaced rings 86 and 88 and the vane members 90 are contoured to dispose the passages 92 to receive the circulating liquid from the turbine member 26 and deflect it angularly thereby in effect, providing a continuation of the turbine shell member 54 to discharge the circulating liquid into the impeller in such a manner that minimum turbulence is encountered as the fluid enters the impeller. The radial vane members 90 may be disposed at an angle axially of the fluid circuit as shown by the circumferential offsetting of the inlet and outlet ends 94 and 96 of the vortex ring 80 represented by the angle 98 to deflect the liquid circumferentially to minimize turbulence when the liquid flows into the impeller 20.

In the operation of my improved fluid coupling the vortex guide ring member 80 receives the fluid as it flows inwardly in the turbine 26. As the liquid flows through the passages 92 its course is deflected radially by the radially spaced rings 86 and 88 and the vane members 90 extending radially and disposed at an angle circumferential as illustrated at 98 to direct the liquid into the fluid circuit of the impeller 20 in such a manner that turbulence of the liquid is minimized. Liquid circulation losses are then reduced and the shock and impact stresses developed as the power transmitting fluid flows from the turbine into the impeller are reduced. The service life of the fluid coupling is increased and the efficiency of the unit is improved.

It will be noted that the radial flange 82 of the vortex ring 80 is illustrated as extending a short distance radially beyond the inner profile 58 of the turbine shell 54 as illustrated at 100. The frontal area of the vortex ring offers a retarding action to the fluid to provide a baffle effect to reduce the drag torque and improve performance of the unit.

It will be noted that the impeller vanes 64 are cut away as illustrated at 102 to accommodate to the vortex guide ring member 80.

Referring now to FIG. 3 it will be observed that a vortex guide ring is carried by the impeller 20 adjacent its outlet which communicates with the inlet to the turbine. The impeller vortex guide ring is generally similar in construction and mode of operation to that of the turbine vortex guide ring. Corresponding parts have therefore been given corresponding reference numerals with the addition of 100.

In operation of this embodiment of my invention the impeller guide vane ring 180 increases the guidance of the fluid, the rings 186 and 188 deflect radially inwardly the fluid as it issues from the impeller and direct it to flow into the fluid circuit of the turbine 26 with reduced turbulence. The impeller vortex guide ring member 180 has its radial vanes 190 disposed at an appropriate angle to deflect circumferentially the liquid issuing from the impeller to redirect it to flow into the turbine 26 in such a manner as to cause minimum turbulence.

The circumferential angularity of the vanes 190 illustrated at 198 deflects the fluid issuing from the impeller 20 to direct it into the fluid passages of the turbine 26 to flow therewith at an appropriate angle to minimize impact losses and reduce turbulence.

In the embodiment illustrated in FIG. 4 it will be noted that a vortex guide vane member 80 is associated with the outlet of the turbine, and that a similar vortex guide ring member 180 is associated with the outlet from the impeller. Where both guide vane rings are employed the liquid is circulated with the maximum degree of guidance whereupon shock losses and turbulence are reduced and the efficiency of operation of the unit is increased.

Attention is directed to the fact that by the use of a selected vortex guide vane ring member it is possible to restrict the flow of fluid in the power transmitting fluid circuit to vary the power transmitting characteristics of the coupling. It is thus possible to utilize a single size coupling unit in association with a vortex guide vane ring selected from a plurality of vortex guide vane rings having desired characteristics to transmit torque efficiently over a wide range of operation. Greater flexibility in the operation of the device is thus possible.

FIG. 5 shows an embodiment of my invention wherein the turbine member 26 is provided adjacent the inner diameter of the fluid circuit with a compound guide vane ring 110 secured as by screws 112 to the turbine hub 114. The compound guide vane ring 110 has a plurality of concentrically disposed fluid deflecting channels 116 and 118 each of which is provided with circumferentially spaced generally radially extended fluid deflecting vanes corresponding with the vanes 90 of the FIG. 2 embodiment.

In the operation of this embodiment of my invention it will be noted that at slow speed the circulating liquid flowing radially inwardly in the channel of the turbine 26 flows into both of the radially spaced fluid deflecting channels 116 and 118. In many instances the circulating fluid will practically all flow through the inner channel 116 as illustrated by the arrows 120. The fluid is guided by the vanes therein to enter the channel of the impeller 20 at such an angle as to minimize turbulence and fluid losses in the circuit. At high speeds of operation the circumferential force exerted on the circulating fluid maintains the fluid radially outwardly in the fluid circuit so that the fluid flowing in the fluid channel of the turbine 26 is largely confined to flow through the channel 118 spaced radially outside of the channel 116.

It will thus be apparent that at high speed operations the vortex fluid flow from the turbine back to the impeller is at a greater radial distance from the center of the fluid coupling than it is at lower speeds.

By guiding and directing the fluid flowing from the turbine it is possible to provide a softer coupling, and one which can be operated efficiently over a wider range of power transmitting characteristics. It is therefore possible by changing the vortex guide ring of a fluid coupling to change the power transmitting characteristics of the device. A basic structure consisting of matching impeller and turbine members can then be modified to operate efficiently over a wide range of power transmitting characteristics by substituting vortex guide members embodying desired characteristics.

It will be apparent that the impeller and turbine members may be formed in any desired manner as by being cast, milled or fabricated. The operation of my improved fluid coupling is substantially the same regardless of whether the impeller and turbine members rotate in the clockwise or in the counterclockwise directions.

While my invention has been described with particular reference to specific embodiments it is to be understood that various changes can be made without departing from the spirit of my invention as defined by the following claims.

I claim:

1. A fluid coupling comprising semi-toroidal confronting vaned impeller and runner shells defining a radial gap therebetween, each discharging to the other across said gap to define a toroidal power transmitting fluid circuit; the entrance edge areas of the vanes in one of said shells being cut back in the portions thereof immediately adjacent the inner surface of said one shell to define an annular recess; and a guide vane ring at the discharge edge area of the vanes in the other shell for minimizing pulsation characteristics of the fluid during its flow through the circuit; said guide vane ring being carried by said other shell and comprising two annular concentric walls extending axially from said discharge edge area of the other shell into the aforementioned annular recess, and baffles extending radially between said concentric walls at spaced points around the annular space therebetween.

2. The combination of claim 1 wherein the baffles are angled circumferentially to direct the fluid in the direction of fluid coupling rotation.

3. The combination of claim 1 wherein one of the annular concentric walls is located immediately adjacent the discharge edge of said other shell, with a portion thereof projecting angularly from said discharge edge to form a fluid-obstructing dam.

4. The combination of claim 1 wherein the guide vane ring is formed as a unitary assembly apart from said other shell; the combination further comprising an annular flange integrally projecting from said assembly for removably mounting same on said other shell.

5. A fluid coupling comprising semi-toroidal confronting vaned impeller and runner shells defining a radial gap therebetween, each discharging to the other across said gap to define a toroidal power transmitting fluid circuit; the entrance edge areas of the vanes in one of said shells being cut back immediately adjacent the inlet portion of their shell to define an annular recess, and a combination guide vane ring at the discharge edge area of the vanes in the other shell for minimizing pulsation charactertistics of the fluid during its flow through the circuit; said guide vane ring being carried by said other shell and comprising two annular concentric walls extending axially from said discharge edge area of the other shell into the aforementioned annular recess, and baffles extending radially between said concentric walls at specified points around the annular space therebetween.

6. A fluid coupling comprising semi-toroidal confronting vaned impeller and runner shells defining a radial gap therebetween, each discharging to the other across said gap to define a toroidal power transmitting fluid circuit, the entrance edge areas of the vanes of each of said shells being cut back adjacent the inlet portion of their respective shell to define an annular recess, a pair of guide vane rings, one of said rings being positioned at the discharge edge area of the vanes in each shell for minimizing pulsation characteristics of the fluid during its flow through the circuit, one of said guide vane rings being carried by each shell, said guide vane rings each comprising two annular concentric walls extending axially from said discharge edge area of a shell into an aforementioned annular recess, and baffles extending radially between said concentric walls at spaced points around the annular space therebetween.

7. A fluid coupling comprising semi-toroidal confronting vaned impeller and runner shells defining a radial gap therebetween, each discharging to the other across said gap to define a toroidal power transmitting circuit, the entrance edge areas of the vanes in the impeller shell being cut back adjacent the inlet portion of their shell to define an annular recess, a guide vane ring at the discharge edge area of the vanes in the other shell for minimizing pulsation characteristics of the fluid during its flow through the circuit; said guide vane ring being carried by said other shell and comprising three annular concentric walls extending axially from said discharge edge area of the other shell into the aforementioned annular recess, and baffles extending radially between said concentric walls at spaced points around the annular spaces therebetween.

8. A fluid coupling comprising semi-toroidal confronting vaned impeller and runner shells defining a radial gap therebetween, each discharging to the other across said gap to define a toroidal power transmitting fluid circuit; the entrance edge areas of the vanes in at least one of said shells being cut back adjacent the inlet portion of their shell to define an annular recess; and a guide vane ring at the discharge edge area of the vanes in the other shell for minimizing pulsation characteristics of the fluid during its flow through the circuit, said guide vane ring being carried by said other shell and comprising a plurality of annular concentric walls extending axially from said discharge edge area of the other shell into the aforementioned annular recess, and baffles extending radially between said concentric shells at spaced points around the annular space therebetween.

References Cited in the file of this patent
UNITED STATES PATENTS

| | | |
|---|---|---|
| 1,904,054 | Kiep et al. | Apr. 18, 1933 |
| 1,959,703 | Birmann | May 22, 1934 |
| 2,074,346 | Sinclair | Mar. 23, 1937 |
| 2,399,852 | Campbell et al. | May 7, 1946 |
| 2,487,250 | La Brie | Nov. 8, 1949 |
| 2,609,140 | Jonker | Sept. 2, 1952 |
| 2,785,636 | Stapleton | Mar. 19, 1957 |
| 2,890,661 | Egbert | June 16, 1959 |